June 9, 1936. E. E. WEMP 2,043,314
CLUTCH CONTROL
Filed May 18, 1931 3 Sheets-Sheet 1
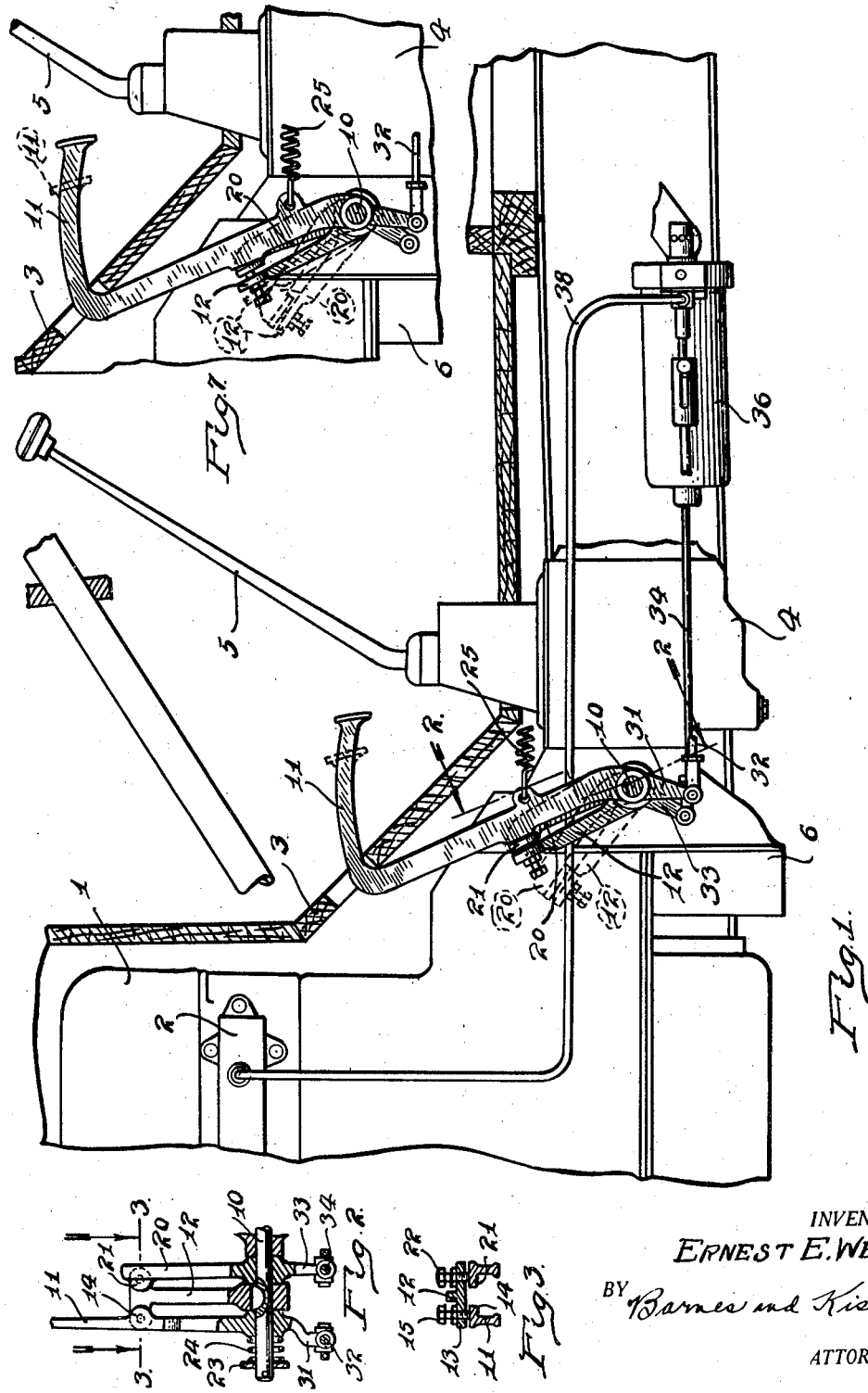
INVENTOR.
ERNEST E. WEMP.
BY Barnes and Kisselle
ATTORNEYS.

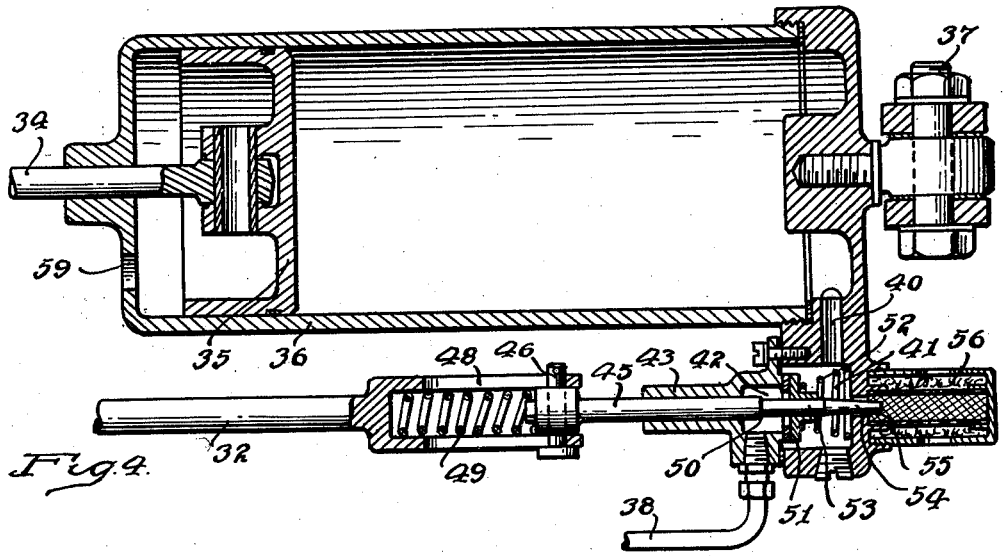
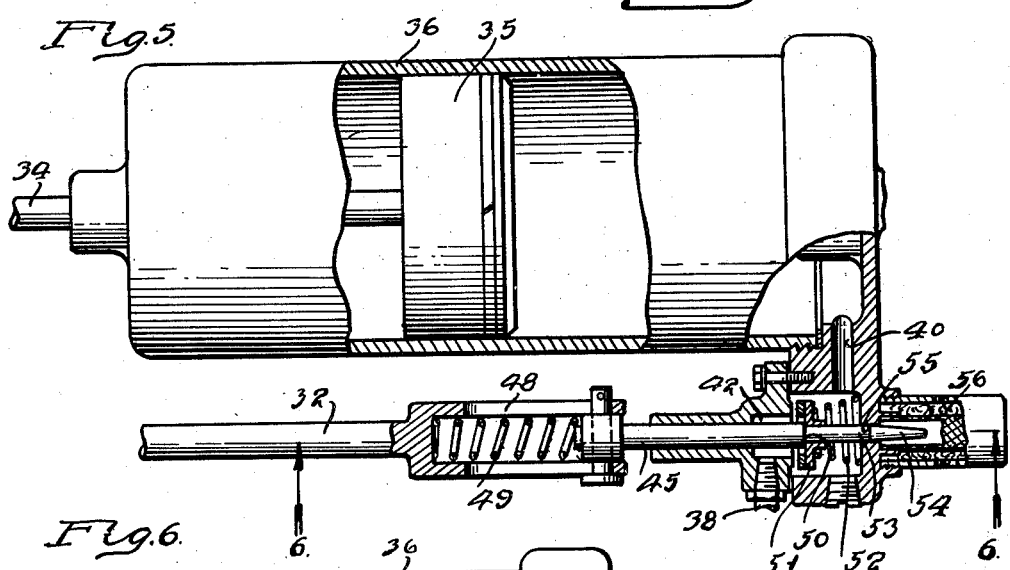
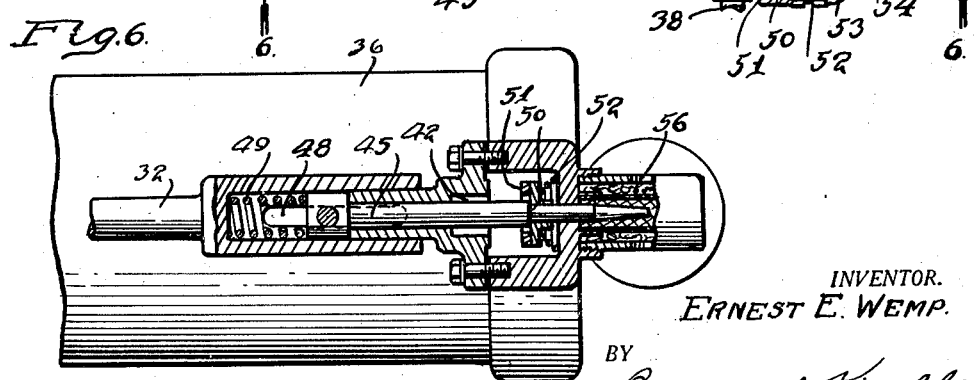

June 9, 1936. E. E. WEMP 2,043,314
CLUTCH CONTROL
Filed May 18, 1931 3 Sheets-Sheet 3
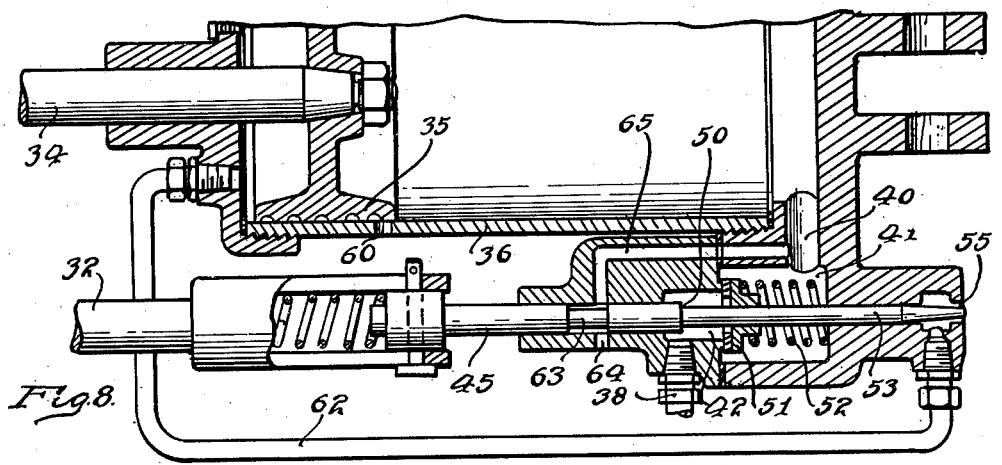
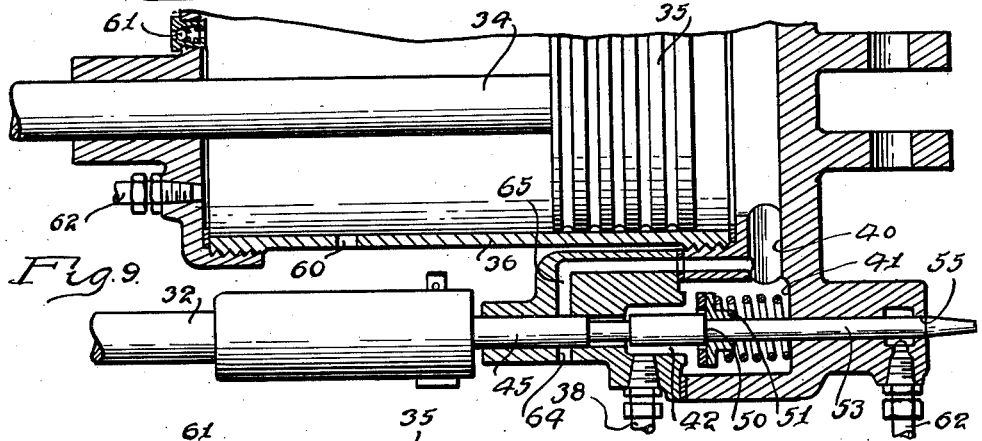
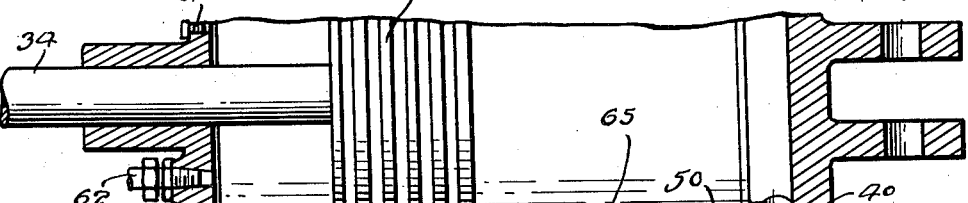
INVENTOR.
ERNEST E. WEMP.
BY Barnes and Kisselle
ATTORNEYS.

Patented June 9, 1936

2,043,314

UNITED STATES PATENT OFFICE 2,043,314

CLUTCH CONTROL

Ernest E. Wemp, Detroit, Mich.

Application May 18, 1931, Serial No. 538,126

6 Claims. (Cl. 192—91)

This invention has to do with the operation of an automotive vehicle with special reference to the control of the clutch. The invention is directed particularly to the provision of a clutch controlling means, by which improved motor vehicle operation is attained while minimizing efforts of the driver. In accordance with the invention the so-called free wheeling action in a motor vehicle may be had at the will of the operator which, however, is entirely under control of the operator so that the free wheeling may be rendered ineffective at any time under all conditions. In this regard, power actuated means is utilized for clutch disengagement, which, however, is supplemented by positive mechanical means under control of the operator for clutch control in the event of failure of the power actuated means for any reason.

Among other objects of the invention is the provision of an arrangement which permits of the operator to control the manner or rate at which the clutch engages, with ease of operation by the driver; also a clutch control mechanism which will prevent unduly rapid wear of the clutch facing material which may be caused by the operator "riding" the clutch pedal, that is to say, allowing the foot to rest upon the clutch pedal during vehicle operation, and for the prevention of slipping of the clutch for the purpose of effecting a fast getaway. A mechanism is provided for accomplishing the above mentioned points without departing from conventional operation; that is to say, the motor vehicle may be operated in the conventional manner with which practically all vehicle operators are familiar.

In the accompanying drawings:

Fig. 1 is the cut-away view illustrating the arrangement of the invention embodied in a motor vehicle.

Fig. 2 is a section taken substantially on line 2—2 of Fig. 1.

Fig. 3 is a section taken substantially on line 3—3 of Fig. 2.

Fig. 4 is an enlarged sectional view illustrating the clutch control cylinder and valve arrangement.

Fig. 5 is a view similar to Fig. 4 illustrating the parts in another position.

Fig. 6 is a detail in section taken substantially on line 6—6 of Fig. 5 showing some of the parts in a position other than that shown in Fig. 5.

Fig. 7 is a view showing the pedal and associated parts, illustrating in dotted lines different positions which some of the parts may take in a modified form of the invention.

Fig. 8 is a sectional view of a cylinder and valve mechanism showing the modified form.

Fig. 9 shows the structure of Fig. 8 with the parts in a different position.

Fig. 10 is a further view of the modified form showing parts in still further position.

As shown in Fig. 1 there are various conventional parts of a motor vehicle comprising the engine 1 with its intake manifold 2, the floor of the car equipped with toe boards 3, the transmission 4 with its control lever 5, and clutch housing 6.

The clutch, after the usual manner, may be controlled by a rock shaft 10. A lever for controlling the rock shaft is shown at 11 provided with the usual foot pad or pedal. This lever 11 is journaled upon the rock shaft 10, as illustrated in Fig. 2. An arm 12 is keyed to the rock shaft and this arm may be generally in the shape of a T, as shown, so that one leg of the T, as at 13, (Fig. 3) lies behind a portion of the lever 11 for the purpose of which lever 11 may have a projecting part or ear 14. The arm 12 may be provided with an adjustable screw abutment 15 with which the ear 14 is designed to contact. An arm 20 is also journaled on the rock shaft 10, and it has a projecting ear 21 which overlies the other leg of the T of arm 12, and the arm 12 may have another adjustable stop or screw 22 against which the ear 21 is designed to abut. These three members, which are mounted upon the rock shaft 10, may be held thereon by means of a washer 23 and spring 24. The lever 11 has the usual retracting spring 25.

With the arrangement thus far described the lever 11 may operate to release the clutch; if the pedal is depressed thus swinging the lever counterclockwise, as Fig. 1 is viewed, its ear 14 causes counterclockwise movement of the arm 12, and when the arm 12 is approximately in the position illustrated by the dotted lines in Fig. 1 the clutch is released. When the pedal is released the spring 25 returns it to normal position, and the clutch packing springs then engage the clutch and in so doing rock shaft 10 back to its normal position thus bringing arm 12 back to its normal position, as substantially shown by the full lines. The clutch lever and its associated parts just described constitute mechanical connections for the control, and in the operation of the release and engagement of the vehicle clutch the movements required by the operator are conventional.

The lever 11 has an extending part 31 connected preferably by a joint to a control rod 32.

The arm 20 has an extension 33 connected preferably by a joint to a rod 34 which in the present instance is a piston rod. These two rods will be seen by reference to Figs. 4 and 5. The piston rod 34 connects to a piston 35 in cylinder 36 which may be mounted to oscillate on a pin or bolt 37. A pipe or tube 38 connects into the intake manifold 2 and to the cylinder 36 through valve mechanism now to be described.

This valve mechanism is, as shown in Figs. 4, 5 and 6, associated with the rod 32. The cylinder head may have a port 40, chamber 41 with chamber 41 normally valved off or closed by a valve from a chamber 42 afforded by a fixture 43 and into which the pipe 38 connects. The valve comprises a reciprocable plunger 45 connected to rod 32 by pin 46 operating in a slot 48 which is normally held at one end of the slot, as shown in Fig. 4 by coil spring 49. The plunger 45 has a shoulder 50 designed to contact with and to open valve 51 held normally closed by spring 52. The plunger also has a reduced portion 53 and a tapered end portion 54 both of which are designed to cooperate with a port 55 leading to the atmosphere preferably through a fixture 56 which may be equipped with screen or steel wool or the like which, while permitting the port 55 to open to the atmosphere, keeps particles of dirt out of the port.

The operation of the clutch control in conjunction with the cylinder and valve is as follows: The operator depresses pedal lever 11 from, say the point of normal position illustrated by the full lines of Fig. 1, to a point substantially illustrated by the dotted lines. This movement is what is known as "lash", and the clutch has not been affected as the clutch is only released under normal conditions by movement of the pedal beyond the dotted line position. The amount of lash movement may be determined by the adjustable stop 15. Accordingly, the only effort required on the part of the operator is that of extending spring 25 which is relatively light, and other incidental friction which is of minor consideration. In this movement of the clutch pedal the rod 32 is moved back to the position substantially illustrated in Fig. 5 thus causing the shoulder 50 to strike and open valve 51 with the part 53 of the plunger closing port 55. Thus the intake manifold connects into the cylinder through the pipe 38, chamber 42, chamber 41 and port 40. The action of the engine in drawing its fuel from the manifold 2 creates a partial vacuum in the cylinder thus causing the piston to move from the position, as shown in Fig. 4, back into the cylinder, as illustrated in Fig. 5. The cylinder at one end may be open to the atmosphere as by a port 59. This retracts the piston rod 34 and causes the arm 20 to move counterclockwise. The arm 20 through its ear 21 rocks the arm 12 and rock shaft 10 and this in reality disengages the clutch, whereas the clutch lever may be moved only to the dotted line position shown in Fig. 1, the clutch releasing arm 12 and the arm 20 moving further in a counterclockwise direction, as illustrated by the dotted lines in Fig. 1. The arm 12 is free to move away from the lever 11 in which action the adjustable abutment 15 and ear 14 merely separate.

To engage the clutch the operator releases the lever and allows it to retract somewhat; this permits the valve 51 to close, and the part 53 of the plunger moves out of port 55. Thus the partial vacuum in the cylinder becomes relieved by atmosphere passing in through port 55. This permits the clutch springs to engage the clutch, rocking shaft 10 clockwise back to its normal position in which action however it must carry with it the piston 35. The clutch engaging process is under the control of the operator as he may control the bleeder port 55. It will be appreciated that if the partial vacuum in the cylinder rises suddenly to atmospheric pressure that clutch engagement will be sudden; conversely, if the partial vacuum is restored to atmospheric pressure gradually the clutch engagement is gradual. The tapered end 54 may control the bleeder port 55 in such manner as to govern the bleeding of atmospheric air into the cylinder. For this purpose the operator need but manipulate the lever 11 between the two positions shown in Fig. 1 which may easily be done without substantial effort in such manner as to reciprocate the plunger 45 thus controlling the effective size of the bleeder port 55 through the means of the tapered valve part 54.

In the event of failure of the vacuum line or any of the valve mechanism, or upon stoppage of the engine, the clutch, as heretofore pointed out, may be disengaged entirely by depressing the pedal substantially down to the floor boards. In this action the valve parts are held safe from damage through the action of spring 49. When the lever is pressed substantially all the way down, the enlarged end of plunger 45 will strike fitting 43 and further movement of the plunger is impossible; the lever, however, may be further depressed, as permitted by compression of spring 49, resulting in the pin 46 moving in its slot 48. It may be that a vehicle thus equipped will be operated by one who is not familiar with the mechanism and who will attempt to operate the clutch in the conventional manner by depressing the lever all the way down. In this event the spring 49 and its associated parts function as above pointed out with no damage to the parts. The only novel thing which will make itself evident to such an operator is the ease of operation of the lever 11.

When an operator desires to free wheel it is but necessary to rest the foot upon the pedal without any substantial effort, and slightly depressing it so as to actuate the valve mechanism to the end that the vacuum cylinder disengages the clutch. The structure has the advantage in that it eliminates tremendous slipping of the clutch which is practiced by some operators in effecting rapid acceleration of the vehicle from a standing start. The bleeder port causes, or rather permits of engagement of the clutch by continuous progressive action. Although the operator may control this action by regulating the bleeding action yet this action is nevertheless continuous to the end that after a short period of time the clutch is fully engaged. Thus it is not possible to hold the clutch lever in a fixed position with the clutch only partially engaged and slipping. Riding of the clutch, to the end that the clutch is damaged by slipping, is substantially eliminated because if an operator rests his foot on the pedal, which is what we mean by riding the clutch, the valve mechanism will be operated to cause clutch disengagement.

In the modified form illustrated in Figs. 7 to 10 many of the parts are the same as those heretofore described and it is thought to be neither necessary nor desirable for these to be redescribed and accordingly, these parts have the same reference characters applied thereto with the new elements in the association specifically described.

In this form the cylinder has a port to the atmosphere, as shown at 60, designed to be sealed by the piston 35 in clutch engaged position, as shown in Fig. 8. The cylinder preferably has a check valve 61 and one end of the cylinder connects through a pipe or tube 62 with the bleeder port 55. The plunger 45 has a reduced portion 63 designed to control the connection between a port to the atmosphere 64, and a vacuum relief passageway 65 leading to the cylinder. The cylinder connects to the engine manifold through pipe 38, chamber 42, chamber 41 and port 40 after the manner previously described.

Fig. 8 shows the parts in a position which they may assume in clutch engaged position. When the lever is depressed plunger 45 is moved from left to right and the first movement is that of dis-aligning the portion 63 with port 64 thus closing off communication of one end of the cylinder to the atmosphere through passageway 65; next, the shoulder 50 of the plunger raises valve 51 thus connecting the cylinder to the vacuum line to the end that the piston is retracted, say to a position illustrated in Fig. 9, releasing the clutch. On initial movement of the piston air is admitted to the opposite side of the cylinder through a check valve 61. When, however, the piston uncovers the port 60, air may enter port 60. The parts may now be substantially in the position shown in Fig. 9 with the clutch released. When the clutch lever is released port 63 of the plunger aligns with part 64 and the valve 51 closes. In this position, as shown in Fig. 10, the vacuum in the cylinder is relieved quickly by air rushing into the same with the result that there is a quick piston movement back towards the position of Fig. 8 with air rushing out of port 60. When, however, the piston covers the port 60 on its return movement, it is checked as escape of air through port 60 is prevented and further movement of the piston must be accomplished by air escaping through the tube 62 and bleeder port 55. This may be controlled by the operator in manipulating the lever to variously position the tapered end of the plunger with respect to the port 55.

Accordingly, the disengagement of the clutch is effected in a manner substantially identical to the manner of clutch disengagement in the form of the invention shown in Figs. 4, 5 and 6. However, clutch engagement is effected in two stages. The first stage being the initial stage which is rapid and which in effect permits the clutch engaging members to move substantially to a point where they are ready to assume final engagement. The final engagement then takes place in a slower manner by escape of air through the bleeder valve 55 which action while continuous may be in a measure controlled as to its rate by the operator in shifting the plunger 45. In Fig. 7 the dotted lines of the control lever illustrate the position it may be in for clutch disengagement; the full lines show the position it and its associated parts may be in while the clutch is engaged. There are two dotted line positions shown of the arm 12; the one which illustrates the furthest countercolckwise movement from clutch engaged position may be the position of the arm 12 in complete clutch disengagement. The other, which is intermediate this extreme dotted line position and the full line position illustrates substantially the dividing line between the two stages of clutch engagement. The arm 12 moves rapidly from its extreme dotted line position to its intermediate position and then slowly by the bleeder port action, from its intermediate position to its full line position. This latter form of the two-stage clutch engagement process materially facilitates operation as the first stage clutch engagement, which is largely ineffective for producing vehicle movement, takes place very rapidly; but the final stage which is really the stage of effective clutch engagement occurring by the bleeder port action, which although slower, is continuous and which in a measure may be controlled as to rate by the operator.

Claims:

1. In an automotive vehicle, the combination of a clutch, a clutch control lever, a cylinder, a piston therein reciprocable for clutch release, means including a pipe line for producing a partial vacuum in one end of the cylinder, a valve for closing the pipe line, means connecting the valve to the clutch lever whereby the clutch lever may open the valve and effect clutch release, valve means connecting the cylinder to the atmosphere for breaking the partial vacuum said valve means being under the control of the lever, the cylinder having an exhaust port for discharge of air for rapid piston movement in initial clutch engagement, said port being covered by the piston after initial rapid movement thereof, and the cylinder having a bleeder port effective for decelerating piston movement in its final clutch engagement movement.

2. In an automotive vehicle, the combination of a clutch, a clutch control lever, a cylinder, a piston therein reciprocable for clutch release, means including a pipe line for producing a partial vacuum in one end of the cylinder, a valve for closing the pipe line, means connecting the valve to the clutch lever whereby the clutch lever may open the valve and effect clutch release, valve means connecting the cylinder to the atmosphere for breaking the partial vacuum, said valve means being under the control of the lever, the cylinder having an exhaust port for discharge of air for rapid piston movement in initial clutch engagement, said port being covered by the piston after initial rapid movement thereof, the cylinder having a bleeder port effective for decelerating piston movement in its final clutch engagement movement, and a valve for controlling opening and closing of the bleeder port operable by movement of the clutch lever.

3. In an automotive vehicle, the combination of a clutch, a clutch control lever, a cylinder, a piston therein reciprocable for clutch release, means including a pipe line for producing a partial vacuum in one end of the cylinder, a valve for closing the pipe line, means connecting the valve to the clutch lever whereby the clutch lever may open the valve and effect clutch release, valve means connecting the cylinder to the atmosphere for breaking the partial vacuum, said valve means being under the control of the lever, the cylinder having an exhaust port for discharge of air for rapid piston movement in initial clutch engagement, said port being covered by the piston after initial rapid movement thereof, the cylinder having a bleeder port effective for decelerating piston movement in its final clutch engagement movement, and a valve for controlling opening and closing of the bleeder port operable by movement of the clutch lever, said valve having a tapered portion located in said port movable under control of the clutch lever for governing the effective size of the bleeder port.

4. The combination with a clutch of an automotive vehicle, of an element shiftable by differential pressures, a chamber in which the element shifts, means operatively connecting the element to the clutch, means including a pipe line connecting into one end of the chamber for producing such differential pressures on opposite sides of said element, a valve normally closing off the pipe line from said end of the chamber, a manually operable clutch lever, a member operably connected to the clutch lever and shiftable thereby and arranged to open said valve whereby the said element is shifted for clutch release, a port for connecting the said one end of the chamber to the atmosphere and arranged to be opened and closed by said member, a port in the chamber arranged to permit rapid exhaust from the chamber upon the closing of the said valve and the opening of the first mentioned port and arranged to become ineffective before said element has completed its movement whereby movement of the element for clutch engagement is checked, a bleeder port for the end of the chamber opposite the end into which the pipe line connects, and the said member connected to the lever having a portion for controlling the size of the bleeder port.

5. The combination with a clutch of an automotive vehicle, a fluid chamber, an element therefor shiftable by differential pressures and connected with the clutch for operating the same, means for producing a partial vacuum on one side of the element whereby the element moves for clutch release, means for connecting said one side of the element to the atmosphere for breaking the said partial vacuum, a port in the chamber on the opposite side of the element and connecting to the atmosphere and arranged to permit rapid exhaust of the chamber on one side of the element with resultant rapid movement of the element in initial clutching engaging action, said port being arranged to be covered by said element and rendered ineffective whereby rapid movement of the element is checked, and a bleeder means for the chamber on the side of the element opposite that in which the partial vacuum was created under the control of the operator and constituting the sole bleeder means for said end of the chamber after the closing of said port whereby the movement of the element may be regulated in its final range of clutch engaging movement.

6. The combination with the clutch of an automotive vehicle, of an operator-actuated clutch control lever, a shaft rockable to release the clutch, an arm on the shaft, said lever arranged to abut against the arm whereby operator-actuation of the lever may actuate the arm and release the clutch, said lever being capable of a range of movement in which it is ineffective upon the arm, a cylinder, a piston therein, valve means connected to the lever and operable by the lever, said valve means shiftable to establish differential pressures on opposite sides of the piston to move the same in the cylinder, a second rockable arm, means connecting the second arm to the piston, said second arm being positioned to abut the first mentioned arm whereby piston movement, through the means of the second arm, rocks the first arm to release the clutch independently of similar movement by the clutch lever, said lever being ineffective to shift said second arm mechanically whereby the lever may be actuated by the operator to move the first arm and release the clutch manually and independent of movement of the second arm and piston.

ERNEST E. WEMP.